United States Patent [19]

Ammeraal

[11] Patent Number: 4,904,306

[45] Date of Patent: Feb. 27, 1990

[54] SEPARATION AND PURIFICATION OF GAMMA CYCLODEXTRIN

[75] Inventor: Robert N. Ammeraal, Worth, Ill.

[73] Assignee: American Maize-Products Company, Hammond, Ind.

[21] Appl. No.: 223,267

[22] Filed: Jul. 22, 1988

[51] Int. Cl.$^4$ ............... C13K 13/00; C08B 37/16
[52] U.S. Cl. ............................. 127/46.1; 127/40; 127/46.2; 127/46.3; 536/103; 514/58; 210/679; 210/691; 210/692
[58] Field of Search ............ 127/40, 38, 48, 46.1, 127/46.3, 46.2, 55; 536/103, 127, 128; 210/679, 691, 692; 514/58

[56] References Cited

U.S. PATENT DOCUMENTS

| | | | |
|---|---|---|---|
| 3,425,910 | 2/1969 | Aranbruster et al. | 435/97 |
| 4,781,977 | 11/1988 | Yagi et al. | 536/103 |
| 4,808,232 | 2/1989 | Beesley | 127/46.1 |

*Primary Examiner*—Chung K. Pak
*Attorney, Agent, or Firm*—Lucas & Just

[57] ABSTRACT

Gamma cyclodextrin is separated and purified by a process that first precipitates the gamma cyclodextrin from solution using a gamma cyclodextrin complexant followed by a step of removing the complexant from the precipitate and then passing the resulting solution containing the gamma cyclodextrin through a chromatographic material from which the gamma cyclodextrin is eluted.

3 Claims, No Drawings

SEPARATION AND PURIFICATION OF GAMMA CYCLODEXTRIN

This invention relates to cyclodextrin and, more particularly, to a method for separating and purifying gamma cyclodextrin. The method employs a two-step process of: first, precipitating gamma cyclodextrin from solution, followed by a second step of eluting gamma cyclodextrin through a chromatographic material.

Cyclodextrins, also called "Schardinger dextrins", are known to be cyclic oligosaccharides composed of 6, 7 or 8 anhydroglucose units bonded together by alpha 1,4 bonds. The six-membered ring is referred to as alpha cyclodextrin, the seven-membered ring as beta cyclodextrin, and gamma cyclodextrin is used to refer to the eight-membered ring.

The ring structure of the cyclodextrin has recently received a great deal of attention because of its ability to act as a host to a wide variety of chemicals. Its ability to form a complex with other chemical compounds has sparked interest in the food and pharmaceutical fields as well as in the chemical field in general. Generally, the cyclodextrin is used to make a guest molecule soluble in water where the guest molecule in water has very low solubility or is insoluble.

Conventionally, cyclodextrins are made by treating a starch slurry with enzyme or acid to produce a gelatinized and liquefied slurry having a DE between 1 and 5. The gelatinized and liquefied starch slurry is then treated with cyclodextrin glycosyltransferase (CGT), at the appropriate pH, temperature and time for the selected enzyme. The enzyme, CGT, is obtained from microorganisms such as *Bacillus macerans, B. magaterium, B. circulans, B. stearothermophilus* and *Bacillus* sp. (alkalophilic) as well as others. The resulting digest from treatment of a gelatinized and liquefied starch slurry with CGT contains cyclic and acyclic dextrins.

Although the amount of alpha, beta and gamma cyclodextrins produced by treatment of a gelatinized and liquefied starch slurry with CGT will vary depending on the selected starch, enzyme, and processing conditions, beta cyclodextrin is considered to be the only commercially viable cyclodextrin made because the amount of alpha and gamma cyclodextrin in the digest is generally low. Typically a digest contains less than 10% gamma cyclodextrin.

Beta cyclodextrin has a lower solubility in water than gamma cyclodextrin. Most users of cyclodextrins prefer to use gamma cyclodextrin to solubulize a guest molecule, however, because of the high cost of gamma cyclodextrin as compared to beta cyclodextrin, they settle for beta cyclodextrin. Gamma cyclodextrin has a higher price not only because of the low amount of production but also because of the complicated methods for separating and purifying gamma cyclodextrin from a digest.

A method has now been discovered that allows for recovery of gamma cyclodextrin in a manner which has commercial applicability. The process of the present invention can be used to produce a highly pure gamma cyclodextrin in a relatively simple manner.

The process of the present invention comprises first adding a gamma cyclodextrin volatile precipitant to a digest containing gamma cyclodextrin to precipitate the gamma cyclodextrin; recovering the precipitate; separating the precipitant from the gamma cyclodextrin to produce a separated product containing the gamma cyclodextrin; and passing the separated product containing the gamma cyclodextrin through a matrix upon which a gamma cyclodextrin inclusion compound has been bound in order to elute substantially pure gamma cyclodextrin.

The digest containing gamma cyclodextrin can be a digest obtained after treating a starch with CGT or a digest from which beta cyclodextrin has already been removed by precipitation or crystallization. Commercial examples of digests containing gamma cyclodextrin from which the beta cyclodextrin has been removed are sold under the name Celdex CH-20 and CH-30 by Japan Maize. Such digests typically comprise cyclic and acyclic dextrins as well as other starch products in water.

Preferably, the digest containing gamma cyclodextrin has had beta cyclodextrin removed. Preferably, the solids level in the digest is between about 10 to about 40% by weight of the total digest. Good results have been obtained with a digest having a solids level of about 20% by weight of total digest.

Preferably, an enzymatic technique is employed in making the digest containing gamma cyclodextrin which favors production of gamma cyclodextrin.

Adding a gamma cyclodextrin volatile precipitant is preferably accomplished by stirring the precipitant into the digest.

The amount of precipitant added is preferably about 10 to about 30% by weight based on the weight of dry solids in solution. Good results have been obtained using precipitant in the amount of about 20% by weight dry solids.

Suitable precipitants include toluene, p-xylene and limonene. Limonene, at appropriate levels, is a food grade hydrocarbon.

In order to form the precipitate, the combined digest and precipitant is preferably stirred for a period of about one to about three days at ambient conditions. Good results have been obtained at about three days. The apparatus for stirring and the speed at which the stirring is carried out is conventional. Good results have been obtained by stirring at a rate of about 1000 rpm using a beaker with a magnetic stirring rod in the bottom of the beaker.

Preferably, the precipitation step is carried out at ambient temperature and pressure.

The precipitate is typically white in color and forms in the bottom of the container.

The precipitate is recovered in a conventional manner such as by filtration or centrifugation.

Preferably, the recovered precipitate is washed about three times with an amount of water equal to the weight of the precipitate. This washing step can also be accomplished by suspending the precipitate in water and recentrifuging to obtain the precipitate. The purpose of the washing step is to remove acyclic components from the precipitate. Preferably, the washing step leaves less than about 5% by weight acyclic components in the precipitate based on the total weight of the precipitate and more preferably less than about 2% by weight.

Separating the precipitant from the precipitated complex is accomplished by volatization of the precipitant. Preferably, the precipitant is removed from the precipitated complex by adding the precipitated complex to water and heating the water to a temperature where the precipitant is volatized without degrading the cyclodextrin.

The resulting separated product containing gamma cyclodextrin may be subject to a carbon bleach and ion exchange step at this point in the process if desired. Additionally, any beta cyclodextrin which is mixed with the separated product containing gamma cyclodextrin may also be removed at this point. Such is done in a conventional manner.

Next, the separated product containing gamma cyclodextrin is passed through a chromatographic column which has been loaded with a matrix on which a gamma cyclodextrin inclusion compound has been bound. Typically, the separated product containing gamma cyclodextrin is contained in an aqueous solution.

The preferred chromatographic material for use in the present invention is taught in copending U.S. application Ser. No. 938,821 filed Dec. 8, 1986, now U.S. Pat. No. 4,808,232, the teaching of which is incorporated herein by reference.

The '821 application teaches that the chromatographic material comprises a matrix upon which an inclusion compound is bound. The matrix itself should be water insoluble and present a stable particle formation such that it is able to withstand dynamic flow conditions. Additionally, the matrix should have a high purity and have the ability to be sterilized. These purity and sterilization aspects are especially applicable when dealing with gamma cyclodextrin which is to be used for foods, cosmetics, and drugs. The matrix must also be susceptible to modification in that it must be able to have the inclusion compound bound thereto.

Specific examples of the matrices taught by the '821 application include silicas, celluloses, polyacrylamide gels, styrene divinyl benzene beads, polyacrylate beads, polystyrene beads and derivatives thereof having the foregoing characteristics. Commercial brands of these matrices include DOWEX 1 and INDION A3. In the present invention, good results have been obtained with DOWEX 1×2 having a mesh size between about 200 to about 400.

Inclusion compounds are compounds which form a host-guest relationship between the gamma cyclodextrin and the gamma cyclodextrin inclusion compound. It is known that different compounds have differing affinities for gamma cyclodextrin. The affinity between the gamma cyclodextrin inclusion compound and gamma cyclodextrin must not be so great as to prevent the gamma cyclodextrin from being eluted from the matrix. In the present invention the inclusion compound is preferably benzoic acid, beta naphthol or phenophthalein. Good results in the instant invention have been obtained with a benzoate radical obtained from sodium benzoate.

The '821 application teaches that the inclusion compound is preferably positioned a distance from the actual surface of the matrix and that the preferred distance is about equal to about four (4) to twelve (12) single bonded carbon atoms bonded in a chain typical of saturated aliphatic carbon compounds. This distance allows the inclusion compound to function without being interfered with by the matrix. In terms of metric units, this distance is about six (6) to eighteen (18) Å with best results obtained at about nine (9) Å. Larger distances can be used with no apparent advantage and without the disadvantage of the chain bending back on itself.

The compound used to space the inclusion compound from the matrix is referred to as a bridging compound. The '821 application teaches that the bridging compound can be any organic compound which is able to bond both to the matrix and to the inclusion compound. Generally, such bridging compounds are bifunctional aliphatic, or aromatic compounds. Such bridging compounds include glycidoxipropyltrimethoxysilane, glycidoxipropyldimethylchlorosilane, glycidoxipropyltriethoxysilane, butyldiethylaminoethyl, butyltriethylamine and 3-phenylpropyldimethylchlorosilane.

The chemistry of forming the matrix with the gamma cyclodextrin inclusion compound bonded thereto is well-known and will vary depending on the chosen matrix, bridging compound, and inclusion compound.

In order to pass the gamma cyclodextrin-containing solution through the matrix, it is preferred to place the matrix into a container that immobilizes the matrix and allows the cyclodextrin-containing solution to pass through the matrix. Preferably, a column is used. Other suitable processes include fixed bed, moving bed, or simulated moving bed processes. Good results have been obtained using columns measuring 70 to 90 cm in length and having 3 to 1 inch internal diameters, respectively. Good results were obtained with a 7.6×70 cm column. On scale up the column should be no wider than it is high, and preferably more oblong. The charge is preferably about 100 g for the 7.6 cm column. The gamma cyclodextrin was eluted with water, at a flow rate of about 16 ml/min, after about 3 liters extending to about 7 liters (2 to 5 column void volumes). Beta cyclodextrin first appeared after about 19 liters (about 14 void volumes) and branched beta cyclodextrin elutes from about 7 to beyond 19 liters.

A large volume of elution water is required to elute beta cyclodextrin but after gamma cyclodextrin exits methods may be employed to quickly remove the beta cyclodextrin from the column. This can be done with 20% n-propanol in water, for example. Water would be recycled from evaporation and drying operations if necessary.

The gamma cyclodextrin can be recovered by concentration and drying. Ion exchange treatment can be employed before drying.

The operation of the column may vary as to resin type and form, mesh size, and bed dimensions consistent with the efficiency of operation. Flow rate may vary and the eluant may be other than water.

Methods of concentration, crystallization and drying are well known in the art and may be conducted accordingly.

These and other aspects of the invention will be more fully understood by reference to the following examples.

EXAMPLE 1

This example compares the results obtained with and without using the precipitation step of the present invention.

EXAMPLE 1A: WITHOUT PRECIPITATION STEP

About 670 g, dry basis, Celdex CH-20 in about 1680 ml water (35% solids) which contained about 50.8 g of gamma cyclodextrin was applied directly to a 7.6×69 cm column of Dowex 1×2, 200–400 mesh, in the benzoate form. Table I shows the overall composition recovered from the column.

TABLE I

| Component | Weight (g) | % |
|---|---|---|
| Acyclic | 538.4 | 90.4 |
| Alpha Cyclodextrin | 6.4 | 1.1 |
| Gamma Cyclodextrin | 35.7 | 6.0 |

TABLE I-continued

| Component | Weight (g) | % |
|---|---|---|
| Branched Beta Cyclodextrin | 6.8 | 1.1 |
| Beta Cyclodextrin | 8.3 | 1.4 |
| TOTAL | 585.6 | 100.0 |

The samples were eluted from the column at an average of about 16 ml/min.

The gamma cyclodextrin appeared in the first six one liter samples which were collected. Table II below shows the solids contained in these first six one liter fractions.

TABLE II

| Fraction | Total Weight (g) | Gamma Cyclodextrin Weight (g) | % Purity of Fraction |
|---|---|---|---|
| 1 | 149.3 | 1.46 | 0.98 |
| 2 | 224.7 | 0.94 | 0.42 |
| 3 | 147.3 | 8.19 | 5.56 |
| 4 | 29.0 | 14.15 | 48.8 |
| 5-6 | 16.4 | 10.92 | 66.6 |
| TOTAL | 566.7 | 35.7 | |

The overall purity was 6.3% with a recovery of 70.3% of the gamma cyclodextrin contained in the original digest.

EXAMPLE 1B: WITH PRECIPITATION STEP

A sample of Celdex CH-20 from the same lot as that used in Example 1A was diluted to 21.9% solids and layered with 190 ml of toluene and stirred for six days. This sample contained a total of 822 grams of solid which had 49.29 g of gamma cyclodextrin. It was then filtered. The filter cake was rinsed with small quantities of water to remove solvent and sludge and then washed on the filter three times with 100 ml portions of water. The filter cake was then suspended in 500 ml water and boiled to remove toluene. The resulting 12.6% solution was concentrated and dried to give 59.0 g dry powder. This dry filter cake contained 48 grams of gamma cyclodextrin. Thus, 1.29 g of gamma cyclodextrin had been lost while the purity of the gamma cyclodextrin in this step was about 81%. This sample was applied to the column of Example 1A and eluted with water at 13-16 ml/min. One liter fractions were collected. The data is summarized in Table III.

TABLE III

| Fraction | Total Weight (g) | Gamma Cyclodextrin Weight (g) | % Purity of Fraction |
|---|---|---|---|
| 1-3 | 0.9 | 0 | 0 |
| 4 | 23.7 | 23.68 | 99.9 |
| 5 | 17.3 | 17.3 | 100.0 |
| 6 | 2.4 | 2.4 | 100.0 |
| 7 | 0.3 | 0.27 | 89.6 |
| TOTAL | 44.6 | 43.65 | |

The overall purity was 97.8% with a recovery of 88.6% of the gamma cyclodextrin contained in the original digest.

As can be seen from Examples 1A and 1B, the purity is greatly inferior in the one stage method compared to the two stage method. Column loading in the two stage process is only about .06 of that of the one stage process, with Celdex CH-20, for equal output of gamma cyclodextrin at inferior purity. The analysis of the product was conducted in a conventional manner by HPLC (high pressure liquid chromatography).

It will be appreciated by those of skill in the art that other methods of chromatographic techniques besides a column can be employed such as fixed bed, moving bed, or simulated moving bed processes.

It will be understood that it is intended to cover all changes and modifications of the preferred embodiment of the invention herein chosen for the purpose of illustration which do not constitute departure from the spirit and scope of the invention.

What is claimed is:

1. A process for separating and purifying gamma cyclodextrin comprising the sequential steps of:
   (a) adding a precipitant to an aqueous solution containing gamma cyclodextrin;
   (b) mixing the resulting aqueous solution containing gamma cyclodextrin and said precipitant for a period of about one to six days to form a precipitate containing gamma cyclodextrin;
   (c) recovering said precipitate;
   (d) washing the recovered precipitate with water;
   (e) separating the precipitant from the washed precipitate in the presence of added water by heating; and
   (f) passing the resulting product containing gamma cyclodextrin through a matrix upon which a gamma cyclodextrin inclusion compound has been bound to recover a substantially pure gamma cyclodextrin.

2. The process of claim 1 wherein the recovered precipitate is washed with equal amounts of water.

3. The process of claim 1 wherein said precipitate is recovered by filtration.

* * * * *